Jan. 19, 1937.  C. J. SCHROEDER  2,068,248
RELIEF VALVE
Filed Dec. 30, 1933  3 Sheets-Sheet 1

INVENTOR
Carl J. Schroeder
BY Bruce K. Brown
ATTORNEY

Jan. 19, 1937.　　　C. J. SCHROEDER　　　2,068,248
RELIEF VALVE
Filed Dec. 30, 1933　　　3 Sheets-Sheet 2
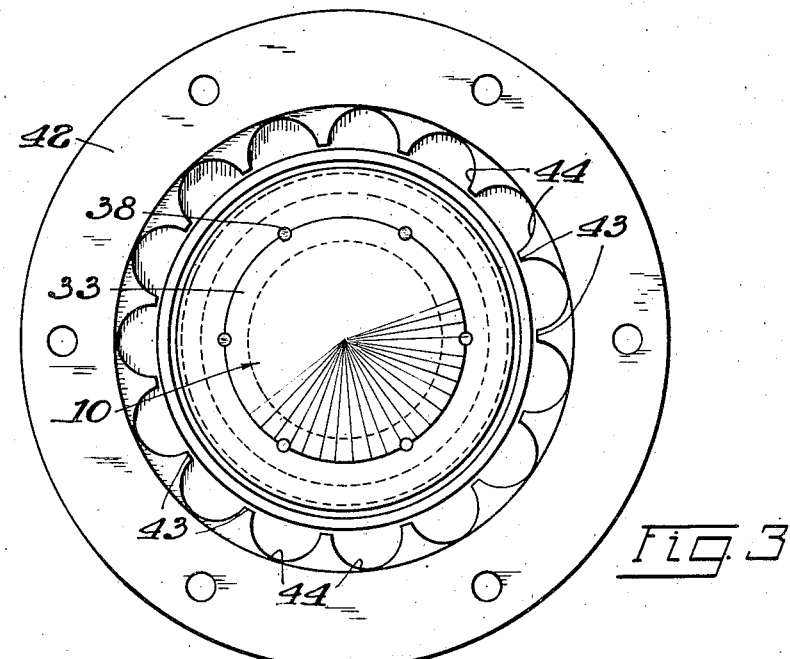
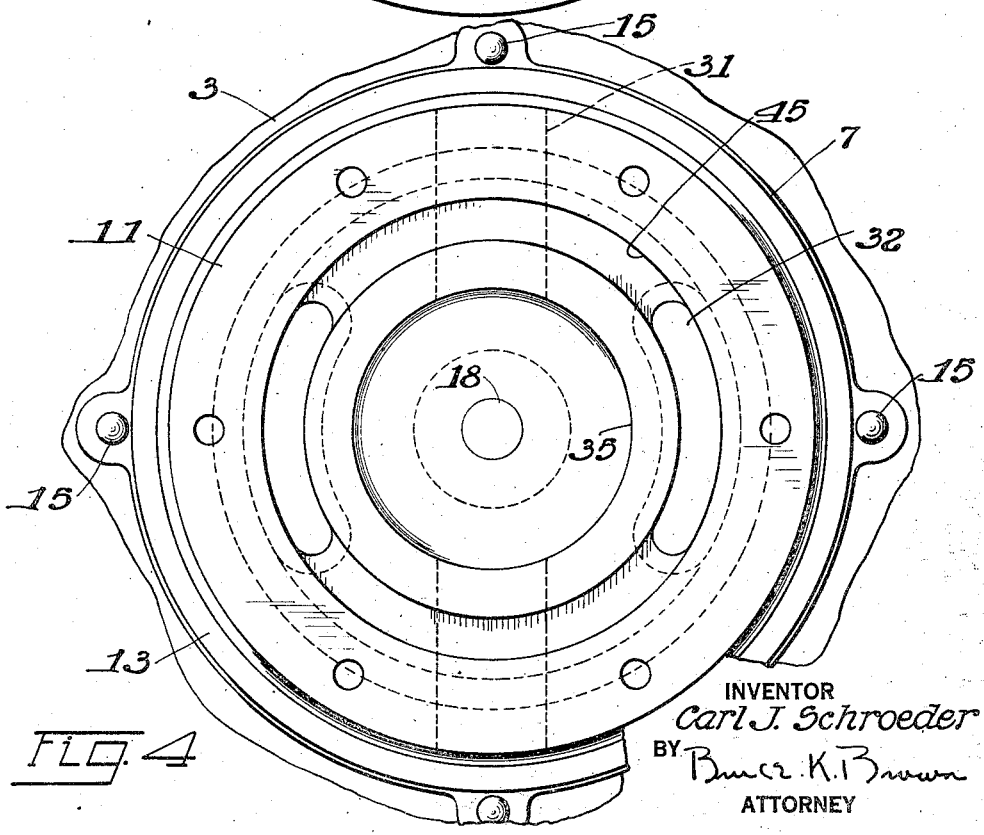
INVENTOR
*Carl J. Schroeder*
BY
ATTORNEY Jan. 19, 1937.    C. J. SCHROEDER    2,068,248
RELIEF VALVE
Filed Dec. 30, 1933    3 Sheets-Sheet 3
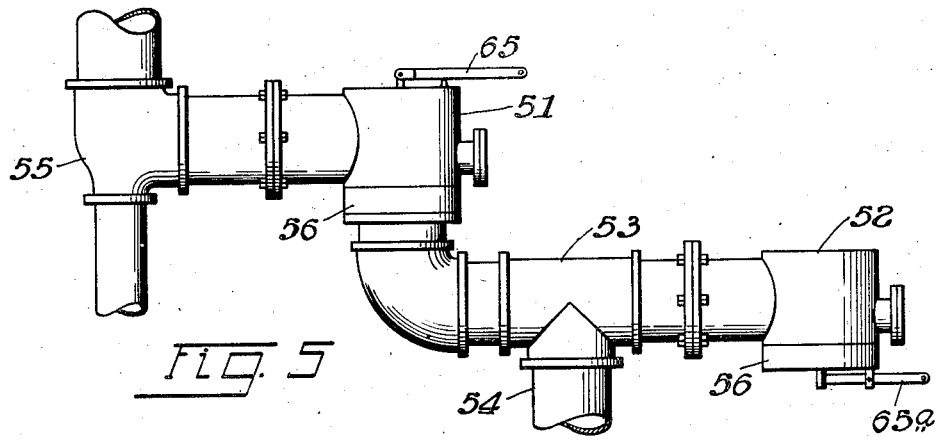
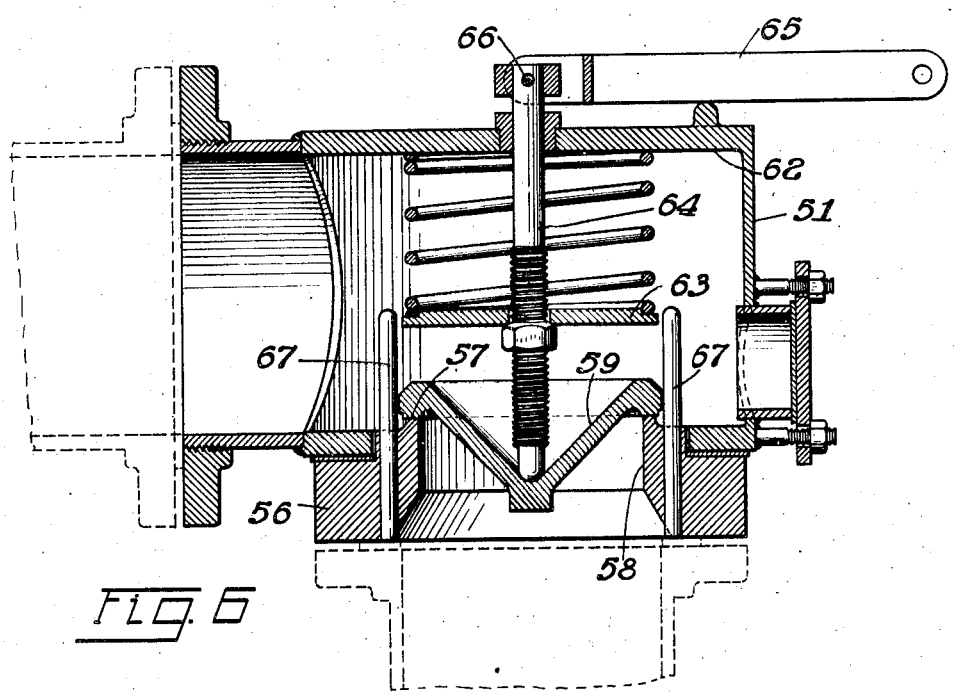
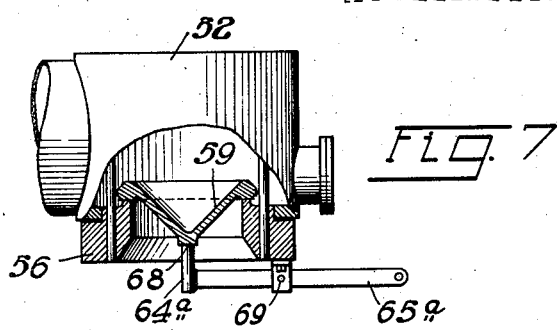
INVENTOR
Carl J. Schroeder
BY
ATTORNEY Patented Jan. 19, 1937

2,068,248

UNITED STATES PATENT OFFICE 2,068,248

RELIEF VALVE

Carl J. Schroeder, Hobart, Ind., assignor to Standard Oil Company, Chicago, Ill., a corporation of Indiana Application December 30, 1933, Serial No. 704,702

9 Claims. (Cl. 277—45)

This invention relates to improvements in relief valves and more particularly to pressure and vacuum relief valves such as used on pressure storage tanks and as safety valves for stills and similar apparatus in the petroleum refining industry.

Heretofore, various types of relief valves have been provided for relieving both pressure and vacuum in hydrocarbon storage tanks, stills and similar apparatus, such valves being constructed with metal to metal valve and seat contacting surfaces. I have found that valves of this general type are in many cases unsatisfactory because of warpage of the parts or because of the accumulation of dirt upon the seat or valve seat contacting surface of such order as to permit leakage. I am aware that valves having resilient packing have been proposed from time to time for use in relief valves wherein the packing consisted of rubber or rubber composition leather and similar compressible substances. All of the substances proposed for the purpose of providing resilient packing in valves constituting the prior art have the disadvantage of being rendered unfit for the purposes for which they are intended under the influence of hydrocarbon vapors and furthermore when such packings are used with seats of steel or iron they are very apt to stick, thus impairing the sensitivity of the valve, particularly where used for low pressure.

An object of the present invention is to provide an improved relief valve incorporating a packing material which is resistant to the action of hot hydrocarbon vapors and having a non-corrosive valve seat which does not permit of the sticking of the packing material thereto.

A further object is to provide an improved pressure and relief valve guide means for reducing valve friction thereby to increase the sensitivity of the valve.

A further object is to provide a relief valve wherein the valve sealing means is self-adjusting to compensate for slight distortion and warpage of adjacent members and for the presence of dirt or the like upon the valve seat.

Another object is to provide an improved relief valve of the character described wherein the clearance between the valve members and the guide means, therefor, automatically increases as the valve members are urged away from their respective seats.

A further object is to provide a relief valve of the character described wherein "clattering" of the valve members during the operation thereof is minimized thereby to eliminate undue wear upon the cooperative contacting surfaces thereof.

A further object is to provide a relief valve incorporating both pressure and vacuum responsive valve members wherein the sensitivity of the vacuum valve member to relatively low pressure differentials is maintained through the normal functioning of the pressure relief valve.

A further object is to provide a relief valve incorporating both pressure and vacuum responsive valve members which is very simple in construction and wherein all of the surfaces requiring machining or grinding may be so finished without the use of special machines or tools.

Other objects, the advantages and the uses of the invention will be understood after reading the following specification and appended claims and after consideration of the drawings forming a part of the specification wherein:

Fig. 3 is a view along the line III—III of Fig. 2;

Fig. 4 is a view along the line IV—IV of Fig. 2;

Fig. 5 is a side elevation of another form of pressure and vacuum relief valve adapted for use as a safety valve for stills;

Fig. 6 is a vertical sectional view of the pressure relief valve mechanism of the assembly illustrated in Fig. 5; and Fig. 7 is a fragmentary sectional view of the vacuum relief valve mechanism of the assembly of Fig. 5.

Figure 1:
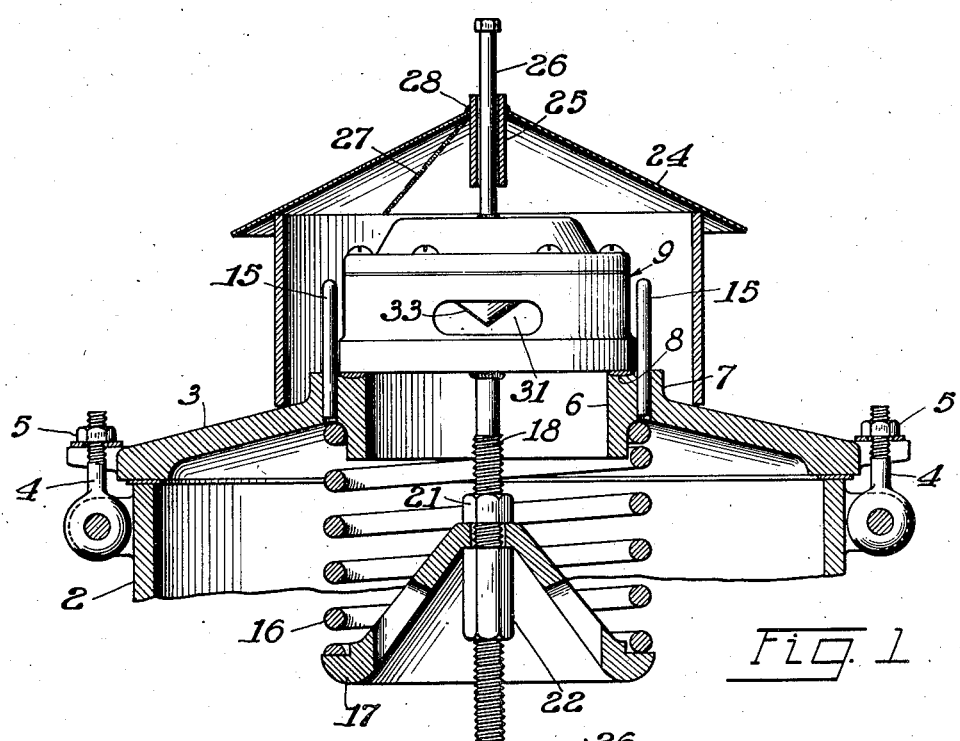
Fig. 1 is a vertical sectional view of a pressure and vacuum relief valve for pressure storage tanks constructed in accordance with the invention.
Figure 2:
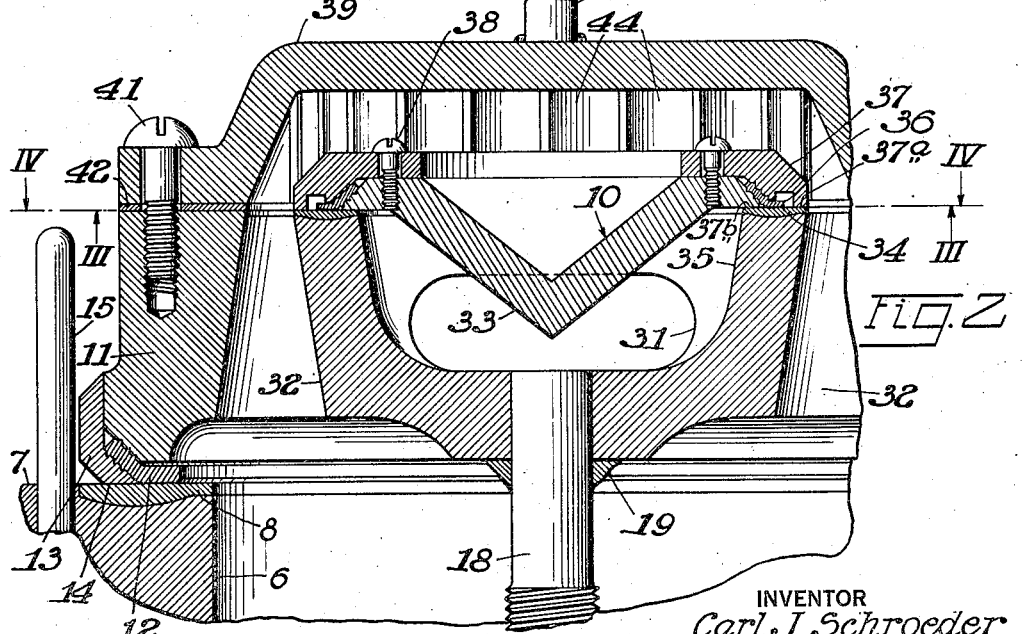
Fig. 2 is a fragmentary vertical sectional view of a part of the mechanism illustrated in Fig. 1.

The relief valve of Figs. 1 to 4 inclusive is of the type designed particularly for use upon the manhole of a pressure storage tank such as employed for the storage of gasoline, naphtha or other volatile liquids. With reference particularly to Fig. 1, I have shown at 2 the cylindrical walls of a manhole forming a conventional part of a pressure storage tank. A manhole cover 3 is detachably fixed over the manhole opening by a plurality of eye bolts 4 and nuts 5. A circular opening 6 is formed through the central portion of the cover 3 and the upper surface 7 of the cover adjacent to the opening 6 provided with a "stellite" insert 8 formed by welding the "stellite" into a suitable recess formed in the cover and thereafter ground and surfaced substantially contiguous with the surface 7 as shown in Fig. 2 thus to provide an exceedingly hard and corrosion-resistant pressure relief valve seat.

"Stellite" is the name given certain alloys of cobalt, a typical composition being cobalt 65%, chromium 30%, tungsten 4%, carbon .75% and iron .25%.

The pressure relief valve indicated generally at 9 in Fig. 1 includes as shown in Fig. 2, the vacuum relief valve assembly generally indicated at 10. The pressure relief valve mechanism comprises a circular casting 11 having an annular ring packing material 12, preferably "thiokol", fixed adjacent the periphery thereof at its lower surface by a hardened still ring 13. The lower edge 14 of the ring being adapted to engage with the "stellite" valve seat 8 thus to limit the compression of the packing 12 between the seat 8 and valve member 11 when the valve is closed. "Thiokol" is the name given a synthetic rubber like material derived from olefin poly-sulphides.

I have chosen the combination of "stellite" seat and "thiokol" packing for use in effecting a tight valve seat for the reasons that "thiokol" maintains its pliant constituency under the influences of hydrocarbon vapors and aging and "stellite" resists the corrosive action of the "thiokol" which is due at least in part to the sulfur content of the packing throughout prolonged exposure, and further for the reason that the "stellite" is possessed of unusual hardness and is therefore not readily scored or worn away under prolonged usage and can be cleaned without scoring. It should be understood, however, that while I have herein specified particular materials for the packing and for the valve seat that other materials having similar characteristics may be employed without departing from the spirit and scope of the invention.

A plurality of valve guide pins 15, four in the present embodiment of the valve, may be fixed upon the manhole cover 3 in upright position and at equal distances apart about the valve seat 8 so as to guide the pressure valve assembly 9 after it is lifted away from its seat 8. Inasmuch as the lifting of the valve 9 is usually accompanied by a slight tilting of the valve relative to its longitudinal axis the clearance between the valve and the guide pins 15 will automatically increase thereby to preclude friction between the valve and guides.

In order that the pressure valve assembly 9 may be loaded to respond to the desired pressure a compression spring 16 may be employed. I prefer to locate the spring on the inner side of the manhole cover 3 concentric with the opening 8, one end thereof resting upon the inner wall of the cover and the other end upon a conical member 17 located upon a threaded rod 18 fixed as by spot welding, as shown at 19, to the casting 11. Adjusting nuts 21 and 22 may be provided to locate the members 17 at the desired position relative to the rod 18 thereby to adjust the compression of the spring.

If desired a cylindrical wall 23 may be located upon the cover 3 about the valve assembly and provided with a water shed or roof 24 centrally located over the wall 23 through the medium of a sleeve 25 located at the apex of the roof and an upright rod 26 fixed to the upper portion of the valve assembly 9. The water shed or roof 24 may be formed in two 180° segments soldered together as shown at 27 and to the sleeve 25 as shown at 28 so that in the event of fire the segments may fall apart and away from the wall 23 thus to provide an unobstructed vent for the valve.

With reference to Figs. 3 and 4 it may be seen that the inlet and outlet ports 31 and 32 respectively for the vacuum relief valve are located within the casting 11 forming the body of the pressure relief valve. The valve member 33 of the vacuum relief valve may be conical in cross section with the apex thereof facing downwardly and adapted to seat at its peripheral portion upon a ground stellite seat 34 constructed in the same manner as the valve seat 8 located upon the upper surface of the casting 11 about a recess 35 formed centrally in the upper wall of the casting, 11 and communicating with the inlet ports 31. A valve packing ring 36, preferably of "thiokol", is adapted to bear upon the seat 34 and is held in place upon the valve member 33 by a metal ring 37 fixed to the valve as by a plurality of screws 38. The ring 37 is of such depth as to contact at 37a with the seat 34 thereby to limit the compression of the packing ring 36 when the valve is seated. The periphery of the valve member 33 in like manner is adapted to rest upon the seat 34 and to cooperate with the ring 37 in limiting the compression of the packing ring 36.

A cap casting 39 serves to close the upper end of the valve casting 11 and is secured thereto by a plurality of screws 41, there being a gasket 42 interposed between the cap 39 and the member 11 to establish a seal therebetween. Aside from serving to close the upper end of the casting member 11 the cap 39, functions to provide guide members for the relief valve 10. These guide members comprise a series of lateral projections 43 on the inner wall of the cap arranged in annular array about the outer side wall of the ring 37. The function of the projections 43 is precisely that of the pins 15.

The spaces 44 between the projections 43 provide ample passage for air admitted through the inlet passageways 31 as it flows through the valve 10 and downwardly into the storage tank through the valve outlet passageways 32. To further facilitate the passage of the air through the vacuum relief valve, an annular recess 45 is formed on the upper surface of the casting 11 communicating with the upper ends of the passageways or ports 32.

I have thus provided an improved pressure and vacuum relief valve wherein high sensitivity in the relief of undue pressure or pressures lower than atmosphere is attained. It may be expected that the pressure relief valve 9 will operate to a greater extent than the vacuum relief valve 10 and such operation of the pressure relief valve accompanied by the mechanical movement of the entire valve assembly will have the effect of jarring, to some degree, the relief valve assembly 10 thus to reduce any tendency which the packing 36 of the vacuum relief valve packing may have to stick upon the valve seat.

It will be noted that the packing member 36 as shown in Fig. 2 is inclined with respect to the valve seat 34 and that therefore as the valve approaches the seat or as it moves away from its seat the lowermost edge of the ring will first contact the seat as the valve is lowered and thereupon move outwardly during the lowering of the valve to wipe the seat clear of any extraneous substances which may be present thereupon. This wiping action of the packing member assures uniform and close engagement between the packing and seat. Furthermore, as the valve is lifted away from its seat the packing is virtually peeled away from its seat, a function which greatly augments the sensitivity of the valve to operation under very low pressure differentials.

The same may be said of the pressure relief valve packing 12.

The relatively small contacting surfaces between the valve guides and the valve members, in both pressure and relief valves, reduces the friction, as to initial movement of the valves, to a minimum while the structure and arrangement of the guides relative to the valves, as heretofore stated, provides an automatic increase in clearance upon the opening of the valves to entirely eliminate friction therebetween.

In both the pressure relief valve packing and the vacuum relief valve packing the inclination of the packing rings with respect to the valve seats gives rise to the application of two forces tending to hold the valve packing tightly upon the seat, the first force being that of the natural tendency of the packing to flex in conformity with its disposition upon the valve member and the second force being that of the pressure of the vapors working thereupon tending to hold the packing against the seat.

The conical contour and disposition of the valve member 33 is such as to reduce "clattering" and the wear which sometimes results therefrom because of its tendency to divide the flow of air and direct it uniformly throughout its entire circumference. The low center of gravity of the conical member aids in stabilizing the lifting movement of the valve.

A further and important advantage obtained in my improved relief valve as described is that the entire valve assembly may be removed from the manhole cover 3 by releasing the nuts 21 and 22 and withdrawing the assembly from the cover. Access to the vacuum relief valve necessitates the mere removal of the cap member 39 thereby reducing both time and labor expended in replacement or repair.

In Figs. 5 to 7 inclusive I have illustrated another form of pressure and relief valve assembly such as may be employed as a safety relief for crude stills or other similar apparatus. In this form of the invention the pressure relief valve is located within a valve housing 51 whereas the vacuum relief valve is located within a valve housing 52, the two housings being in communication with one another through a manifold 53 adapted for connection through a suitable pipe 54 with the still. The outlet port of the pressure relief valve may be connected as shown to a vapor line 55.

With reference to Fig. 6 the pressure relief valve comprises a member 56 providing an annular valve seat 57 and inlet port 58. The valve member 59 is substantially conical in shape with the apex thereof pointing downwardly and extending below the seat 57. A compression spring 61 interposed between the upper wall 62 of the housing 51 and a plate 63 located upon a threaded rod 64 bearing at its lower end on the inner wall of valve member 59 functions yieldingly to urge the valve upon its seat. A lever 65 may be provided on the upper side of the housing 51 for lifting the rod 64 against the force of the spring 61 through a pivotal connection 66 thereby to permit the valve to open at such times as when the operation may desire to exhaust vapors under pressure from the still into the vapor line 55.

As in the case of the valve disclosed in Fig. 1, guide pins 67, arranged in annular array about the periphery of valve member 59 and extending parallel to the axis thereof, are provided to guide the valve as it moves toward or away from its seat 57.

The vacuum relief valve (see Fig. 7) is substantially identical in structure to the pressure relief valve 57—59 except that a valve stem 64a is located beneath the valve and contacts therewith as shown at 68 and the operating lever 65a is pivotally mounted at 69 at the underside of the valve housing 52 so that the operator may lift the valve by drawing down upon the outer end of the lever against the vapor pressure within the manifold 53 acting upon the valve thereby to exhaust vapors from the still to atmosphere.

Although I have described my invention by showing its application to specific examples, these are given for the purpose of illustration only and are not intended to limit the scope of the invention whose breadth is measured only by the limitations of the following claims.

I claim:

1. In a relief valve for use in hydrocarbon storage and treating systems, means providing a flat annular valve seat, said seat being surfaced with "stellite" insert, a valve member adapted normally to rest upon said seat, and a "thiokol" packing ring for said valve adapted to engage with said seat and rest upon the stellite insert to provide a fluid tight seal therebetween.

2. In a relief valve for use in hydrocarbon storage and treating systems, means providing a flat annular valve seat, said seat being surfaced with an insert of a cobalt alloy including chromium and tungsten, a valve member adapted normally to rest upon said seat, and a flexible packing ring of material derived from an olefin polysulphide for said valve adapted to engage with said seat and rest upon the cobalt alloy insert to provide a fluid tight seal therebetween.

3. A relief valve as described comprising, means providing a valve seat, a pressure relief valve assembly adapted normally to rest upon said seat, guide means for guiding said valve assembly vertically toward and away from said seat, and a vacuum relief valve contained within said pressure relief valve assembly including an annular substantially flat valve seat of continuous unbroken area and a circular valve member formed with convex and concave conical walls on opposite sides thereof and presenting an unbroken outer surface, with the apex thereof extending downwardly below the plane of the adjacent seat, and having an extending substantially flat surface adapted under force of gravity alone to bear upon the substantially flat valve seat, said valve member having its low pressure side communicating at opposite sides thereof with the pressure side of said pressure relief valve assembly.

4. A relief valve as described comprising, means providing a valve seat, a pressure relief valve assembly adapted normally to rest upon said seat, guide means for guiding said valve assembly vertically toward and away from said seat, and a vacuum relief valve contained within said pressure relief valve assembly including an annular substantially flat valve seat of continuous unbroken area and a circular valve member formed with convex and concave conical walls on opposite sides thereof and presenting an unbroken outer surface, with the apex thereof extending downwardly below the plane of the adjacent seat, and having an extending substantially flat surface adapted under force of gravity alone to bear upon the substantially flat valve seat, said valve member having its low pressure side communicating at opposite sides thereof with the pressure side of said pressure relief valve assembly the air inlet passageways therefor extending through the side walls of the body of said pressure relief valve.

5. A relief valve comprising, means providing an annular valve seat of hard corrosion resistant material providing a continuous unbroken valve engaging area, a valve assembly cooperating with said seat, including a rigid body member adapted to bear at its periphery upon the innermost region of said annular valve seat, a flexible valve sealing ring having a relatively high resistance to the solvent action of hydrocarbon liquids, means securing said sealing ring upon said valve body member in such a manner that the outermost portion of the ring may lie flat upon said seat to provide sealing engagement therewith, and means associated with said last-named means for contacting said seat and compressing that portion of the ring adjacent to the body member into engagement with said seat under the force acting upon said valve assembly to urge it toward said valve seat.

6. A relief valve comprising, means providing an annular valve seat of hard corrosion resistant material providing a continuous unbroken valve engaging area, a valve assembly cooperating with said seat, including a rigid body member adapted to bear at its periphery upon the innermost region of said annular valve seat, a flexible valve sealing ring of relatively thin material having a relatively high resistance to the solvent action of hydrocarbon liquids, means securing said sealing ring upon said valve body member in such a manner that the outermost portion of the ring may lie flat upon said seat to provide sealing engagement therewith, and means associated with said last-named means for compressing that portion of the ring adjacent to the body member into engagement with said seat under the force acting upon said valve assembly to urge it toward said valve seat, said second named means including an annular abutment located beyond the periphery of said sealing ring and adapted to engage with said seat thereby to provide a space above and beyond the outer portion of said sealing ring when said ring is engaged with the valve seat, as described.

7. In a valve of the character described, a flat annular valve seat, a valve adapted to rest upon said seat, said valve comprising a rigid body assembly, having a portion, at the periphery thereof, adapted concentrically to engage with the innermost and outermost region of the surface of said annular valve seat and to provide an annular space therebetween, and a normally flat flexible valve sealing ring secured, at its inner-edge portion, to said rigid assembly and having its unsecured portion extending into said annular space for contact with said valve seat.

8. In a relief valve, means providing an annular valve seat of a hard corrosion-resistant material providing a flat continuous unbroken valve engaging area, a valve assembly cooperating with said seat, said assembly including a rigid valve member, a flexible sealing ring having a relatively high resistance to the solvent action of hydrocarbon liquids, and means securing said sealing ring upon said valve body in such manner that a portion of the ring is fixed against movement upon the rigid body and inclined relative to said valve seat and another portion of the sealing ring is caused to flex and to lie flat upon the seat when the valve assembly is moved toward the seat, said means having a part thereof contacting said seat.

9. In combination with a pressure relief valve comprising a flat annular valve seat and a substantially cylindrical capped valve member, said cap member having a plurality of vertical ribs on the interior wall thereof, and said cylindrical valve member having a plurality of ports in the walls thereof opening to the atmosphere, said valve member being adapted to rest upon the said valve seat; a superposed vacuum relief valve contained within the said pressure relief valve member, said vacuum relief valve comprising a valve seat located in a substantially horizontal plane, a valve member adapted to rest at its periphery upon said seat, and guided toward or away from said seat by the vertical ribs on the interior wall of the aforementioned cap, said vacuum relief valve having that portion within the confines of its seat engaging portion, formed with concave and convex conical walls on opposite sides thereof and presenting an unbroken outer surface with the apex thereof extending downwardly below said valve seat, the center of gravity of said vacuum relief valve being located upon a vertical axis extending through said apex and at a point below the vacuum relief valve seat.

CARL J. SCHROEDER.